Aug. 18, 1970 G. G. RANNEFELD 3,524,803
METHOD OF ELECTROLYTICALLY ETCHING FIELD
FILAMENTARY MATERIAL TO MAKE EMITTERS
Filed May 13, 1968
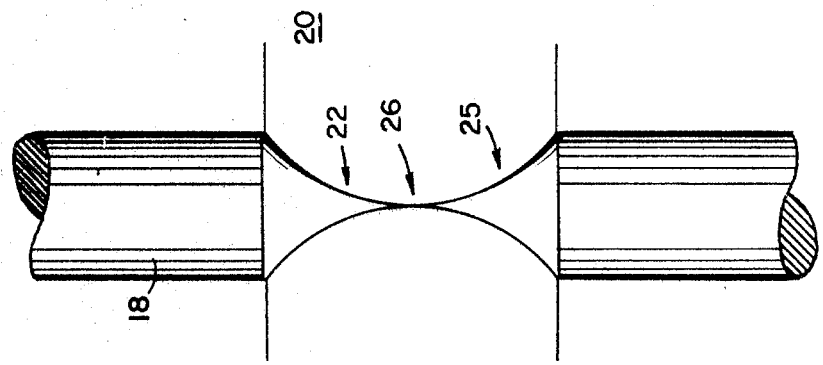
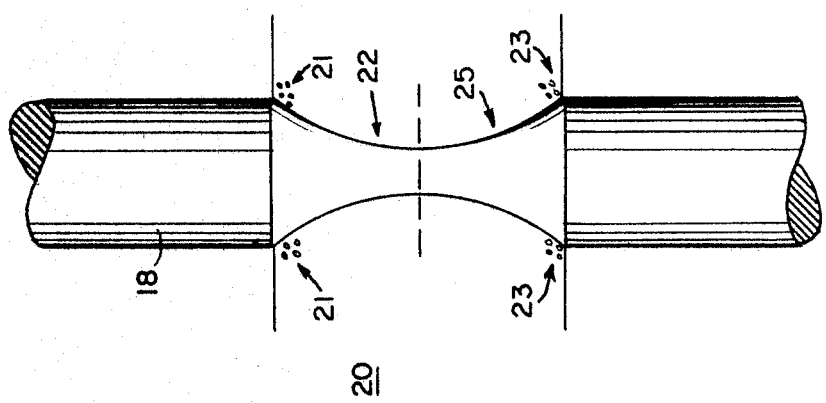
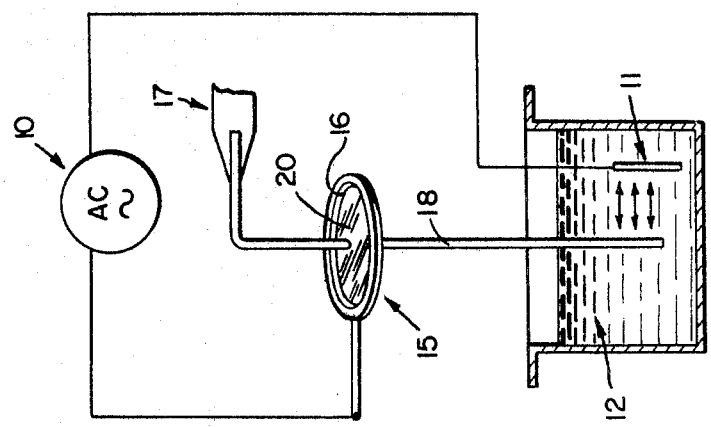
INVENTOR
GARY G. RANNEFELD
BY
ATTORNEYS United States Patent Office 3,524,803
Patented Aug. 18, 1970

3,524,803
METHOD OF ELECTROLYTICALLY ETCHING FIELD FILAMENTARY MATERIAL TO MAKE EMITTERS
Gary G. Rannefeld, Decatur, Ala., assignor to the United States of America as represented by the Secretary of the Army
Filed May 13, 1968, Ser. No. 728,653
Int. Cl. C23b 3/04
U.S. Cl. 204—142
9 Claims

ABSTRACT OF THE DISCLOSURE

A method for fabricating field emitters where the fabrication is due to an electro-chemical etching process which is automatically interrupted at the precise time fabrication is complete, such interruption being solely due to the action of gravity on the material being fabricated thereby interrupting the flow of current from an AC source to an etching film through which the material to be fabricated is passed. An electrolyte solution is used for completing the conduction path. Hydrogen gas bubbled off during one-half cycle of the AC source protects the upper shank portion of the material being fabricated, while the ionic form of the material being fabricated, which is the result of the etching reaction occurring during the other half cycle of the AC source, protects the lower shank portion of the material being fabricated.

BACKGROUND OF THE INVENTION

This invention is an improvement in the fabrication process used to produce field emitter tips employed in high-resolution electron guns. This method eliminates the need for human control if the fabrication procedure. In previous procedures, an operator was required to stop tip etching at the critical moment. In the present invention, etching is stopped automatically by allowing the weight of the extended wire to cause the break in current, thereby stopping etching. As a result, the yield of this process is much higher and tip performance is predictable from a fixed set of process parameters. This procedure also allows the use of less-skilled personnel in tip fabrication. This process may be used to fabricate field emitters of high resolution, which may be used, for example, for cathode ray tubes or high density memories.

In prior art etching processes involving electro-chemical etching reactions, DC squares were used with results which were not as good as those achieved by the use of an AC source in the method of the present invention. The use of an AC source to accomplish the etching process is a definite improvement over the prior art because during the two half cycles of the AC source, protective substances are given off. During one-half of the cycle, hydrogen gas is liberated from the etchant film, the hydrogen gas protecting the upper shank portion of the material being fabricated, while during the other half of each cycle the ionic form of the material being fabricated is given off, as a result of the etching reaction occurring during this half cycle. These ions protect the lower shank portion of the material being fabricated.

Some prior art etching techniques have employed the use of an AC source, however, not for the same purposes. An example of this is Pat. No. 3,184,399 to Schnable et al., which issued on May 18, 1965. In this patent, an AC voltage supply is used in the etching process to cause the electrolyte to etch a semiconductor body by alternately injecting "holes" at the necessary intervals. Other prior art techniques have had to consider the concentration of the electrolyte solution and the concentration of the etching solution. No such consideration is necessary in the method of the present invention. The speed of the process and the amount of resultant etching are predominately dependent on the value of the AC current source.

Another deficiency predominant throughout the prior art is the fact that prior art methods are not reproducible. The method of the present invention overcomes this deficiency by the use of an AC source, as hydrogen gas is only given off in this process when such a source is used. The reason for this is that hydrogen gas does not bubble off when the current flows in the direction to etch tungsten, but only when the current flows in the opposite direction.

With these and other disadvantages of the prior art in view, an object of the present invention is to provide a new and improved method for fabricating field emitters of high resolution.

Another object of the present invention is to provide a new and improved method for fabricating field emitters of high resolution, wherein the etching process is automatically interrupted at the precise moment when the fabrication is completed.

A further object of the present invention is to provide a new and improved method for fabricating field emitters of high resolution, wherein the method is reproducible.

Other objects and many of the attendant advantages of this invention will be readily appreciated as the invention becomes better understood by reference to the following description when taken in conjunction with the following drawings wherein:

FIG. 1 is a pictorial representation of an apparatus capable of performing the method of the present invention;

FIG. 2 is a cross-sectional view of the etching solution containing the field emitter wire, during the process of the present invention, and FIG. 3 is a cross-sectional view of the etching solution containing the field emitter wire during the process of the present invention, taken at a later point in time than that of FIG. 2.

DETAILED DESCRIPTION

Referring now to FIG. 1, which shows an apparatus capable of performing the method of the present invention, an alternating current source 10 is connected to an electrode 11 which is placed in an electrolyte solution 12. The other lead of the alternating current source 10 is connected to a metallic holder 15 having an aperture 16 therein, the metallic holder 15 acting as a second electrode. A manipulator 17 is used to position a wire blank 18 of the material to be fabricated, which acts as a third electrode, so that it passes through the aperture 16 and into the electrolyte solution 12. The aperture 16 contains an etchant solution 20 which is of film thickness. If it is desired to fabricate a tungsten field emitter by application of the present method, a tungsten wire blank is used. The electrode 11 located in the electrolyte solution 12 is either a helical tungsten electrode or a Nichrome/electrode, neither of which dissolves in the electrolyte solution. The electrolyte solution 12 used in this instance is cupric sulfate, although other electrolyte solutions may be used. The metallic holder 15 is a Nichrome wire loop. A stainless steel plate with a hole drilled therein, or a metallic plate of another material which will not react with the etchant solution 20 contained in the aperture 16 may also be used. The etchant solution 20 used in one application of the method of the present invention is a thin film of sodium hydroxide although, again other hydroxyl solutions may be used. A typical value of the AC voltage source 10 is six volts, which yields optimum results, although other voltage sources may be utilized if desired.

Before the method of the present invention can be performed, the etchant film 20 must be prepared. The concentration of this etchant solution 20 is not a critical factor in the fabrication of the field emitter tip. In preparing the etchant film 20, the Nichrome wire loop 15 was horizontally dipped into a one molar sodium hydroxide solution and rather rapidly removed. One method of determining if the film resulting from the dipping process is of the proper thickness is by holding the loop 15 in front of a light source, so that a reflection is visible upon the surface of the film. A very thin film exhibits a flat spot in the center that soon bursts. The other extreme, a very thick film exhibits a fully convex surface. The film having the proper thickness is determined by tilting the loop 15 into a vertical position, tilting it back into a horizontal position, and observing a flat spot in the center which disappears in about one second. By changing the thickness of the etchant film 20, the length of the taper of the fabricated tip can be varied. This is due to the fact that the wire blank 18 is etched along the entire length that is in contact with the sodium hydroxide etchant solution 20.

The next step involved in the method is to provide an electrolyte solution 12. The electrolyte solution 12 used in one application of the method of the present invention, where a tungsten field emitter was being fabricated, was a cupric sulfate solution. An electrode 11 is placed in this electrolyte solution. The electrode 11 utilized in this application was a helical tungsten electrode; a Nichrome electrode could have also been utilized.

The Nichrome wire loop 15 containing the etchant solution 20 (in this application, sodium hydroxide) in the loop aperture 16, is then placed above the electrolyte solution 12. The material 18 to be fabricated, in this instance, tungsten, is then passed through the sodium hydroxide film 20 into the cupric sulfate electrolyte solution 12. At this point in time, no etching of the tungsten wire blank 18 has occurred, and such etching will not occur until the voltage source 10, in this case a six-volt AC source, is connected between the wire loop 15 and the tungsten wire electrode 11.

ETCHING PROCESS

A six-volt AC source 10 is then connected to the Nichrome wire loop 15 and the tungsten wire electrode 11. The cupric sulfate electrolyte solution 12 completes the conduction path which is as follows: from the AC source 10 to the first electrode 11, through the cupric sulfate electrolyte solution 12 to the tungsten wire 18 being fabricated, then through the sodium hydroxide etchant film 20 to the Nichrome wire loop 15, and then back to the AC voltage source 10. The use of the electrolyte solution 12 allows the completion of a conduction path without having to physically touch the material being fabricated, which is essential for the automatic interruption feature of the method of the present invention.

The AC voltage source 10 being applied has two half cycles. During one of the half cycles, the Nichrome wire loop electrode 15 is at a positive potential. The wire-blank 18 of the material being fabricated is negative with respect to the Nichrome wire loop electrode 15. At this time the tungsten wire blank 18 acts as a cathode in the fabrication reaction which occurs in the etchant film 20, the cathode reaction being of the form:

$$2H_2O \rightarrow H_2\uparrow + 2OH^-$$

This reaction gives off hydrogen gas bubbles. This hydrogen gas bubbling action only occurs when an AC source is used. Hydrogen gas bubbles are not formed when the current flows in the direction to etch the tungsten 18, only when the current flows in the opposite direction. Therefore, if a DC source is used to etch, no hydrogen bubbling will occur. The hydrogen bubbles given off during this reaction rise forming a protective layer as they travel upward forming a tapered conical tip on the tungsten wire blank 18 being fabricated. The upper portion of the tungsten wire blank 18, which is termed the upper shank, is therefore protected in this manner.

During the other half cycle, the action occurring at the tungsten wire blank 18 is what is termed the etching reaction. It is this reaction which actually etches the tungsten wire blank 18. The Nichrome wire loop electrode 15 is at a negative potential. The tungsten wire blank 18 is positive with respect to the Nichrome wire loop electrode 15. At this time the tungsten wire blank 18 acts as an anode in the fabrication reaction which occurs in the etchant film 20, the anode reaction being of the form:

$$W + 6OH^- \rightarrow WO_3 + 3H_2O$$

During this reaction, the material 18 being fabricated, in this case a tungsten wire blank, is actually etched to form a conical tip on the upper shank portion. A mirror-like image conical tip is also formed on the lower shank portion. The tungsten trioxide which is a product of this etching reaction dissolves and the tungstate ion, which is heavier than the sodium hydroxide etching solution settles downward and as it does so it protects the lower shank portion. We, therefore, have protection of the shank at both the upper and lower portions; the least protection is in the middle where the conical tip is formed.

The pictorial illustration of what is occurring during the etching process can be seen by referring to FIGS. 2 and 3. FIG. 2 shows a cross section of the etching solution 20 with the tungsten wire blank 18 passing through it during the occurrence of the etching process. As can be seen, hydrogen bubbles, designated by the numeral 21, rise towards the top or upper portion 22 of the shank. Tungstate ions, designated by the numeral 23, settle towards the bottom or lower portion 25 of the shank. FIG. 3 shows the same view as in FIG. 2, however it shows the situation at a later point in time. More specifically, FIG. 3 shows the point in the etching process just prior to the breaking and separation of the upper and lower shank portions 22 and 25, with the resultant current interruption.

AUTOMATIC INTERRUPTION FEATURE

The etching process reduces the diameter of the wire blank 18, and a point is reached at which the wire 18 breaks and the lower shank portion 25 drops into the cupric sulfate electrolyte solution 12. This breaking occurs solely due to the weight of the lower portion 25 of the shank and the action of gravity on this portion. The length of this lower shank portion 25 can be varied so as to increase or decrease the time at which the breaking occurs; this variation being dependent on the fineness of the tip 26 size desired.

When the lower shank portion 25 breaks off from the upper shank portion 22, the conduction path is broken and the circuit opens. The etching process immediately stops since there is no longer any voltage supply to the etchant film 20 and, therefore, the etching process cannot continue. The over-all reaction which has occurred during the time the circuit was closed is represented by a chemical reaction of the form:

$$W + 3H_2O \rightarrow WO_3 + 3H_2\uparrow$$

This chemical reaction may be termed the fabrication reaction.

MODIFICATIONS

The voltage applies does not affect the size of the tip 26; it only affects the taper of the shank. The size of the tip 26 is only affected by the weight of the lower portion 25 of the blank 18. This weight is controlled by the length, assuming a uniform thickness throughout the blank 18. The only critical value is the value of the AC voltage supply 10, which has been determined to be six volts for optimum results. A lower voltage decreases the hydrogen bubbling effect and yields a more striated tip which is weaker in strength. A higher voltage increases the bubbling effect and thereby breaks the etchant film 20, interrupting the process before completion; if allowed to completion the tip 26 would probably be more nearly conical.

As was previously mentioned, the concentration of the etchant solution 20, as well as that of the eletcrolyte solution 12, are not significant. The speed of the process and the amount of etching which occurs are predominately dependent on the value of the AC source 10. With an electron microscope, a tip radius of approximately 200 angstrom units was measured for a tip fabricated by application of the method of the present invention.

APPLICATION

One application of the method of the present invention is in fabricating field emission tips for electron guns. Not only is the process inexpensive, but also the field emitters resulting therefrom, when used in the fabrication of electron guns assemblies, result in a narrow beam of high resolution. Field emitters of the type which may be manufactured by the method of the present invention may also be incorporated into computer memories to increase their capacity. Utilization of the field emitter produced by the method of the present invention yields a low-energy electron beam, and these tips may be readily utilized in applications requiring this property.

CLEANSING

Several methods are available for cleaning the field emitter tip produced by application of the method of the present invention. One such method is to clean the tip in a solution of sodium hydroxide and then in distilled water.

It is to be understood that the above-described embodiment of the invention is merely illustrative of the principles thereof and that numerous modifications and embodiments of the invention may be derived within the spirit and scope thereof, such as decreasing the thickness of the etchant film in order to make a shorter emitter tip; increasing or decreasing the voltage source if it is desired to vary the taper of the field emitter tip; or varying the length of the lower shank portion if it is desired to decrease or increase the size of the tip produced.

What is claimed is:
1. A method for fabricating field emitters of high resolution comprising the steps of:
   positioning a filament blank substantially vertically and coaxially within an aperture defined by an inner cylindrical wall of a metallic holder electrode so that said filament is radially spaced from said electrode wall, providing a film of etchant electrolyte spanning the space between said filament and the electrode and supported therebetween by the surface tension of said electrolyte;
   applying an external alternating voltage source across said wire blank and said electrode so as to cause a current flow through said film of etchant electrolyte, thereby etching the filament to be fabricated due to the current being applied through the etchant film, and automatically interrupting the current flow when the fabrication is completed solely as a result of the cessation of the electro-chemical action between the etchant film and the filament to be fabricated.

2. A method for fabricating field emitters of high resolution in accordance with claim 1 wherein the step of placing a filament to be fabricated in the etchant film and in the electrolyte solution comprises the further steps of:
   holding the filament to be fabricated above a metallic holder electrode having an aperture, and
   passing the wire blank through the etchant film located in the aperture in the direction of desired tip formation until it passes into the electrolyte solution to a desired depth.

3. A method for fabricating field emitters of high resolution in accordance with claim 2 wherein the step of preparing an etchant film comprises the further steps of:
   dipping the metallic holder electrode containing the aperture, into an etchant solution;
   rapidly removing the metallic holder electrode from the solution so as to yield a film of the etchant solution in the aperture, and
   determining the proper thickness for the film in the aperture.

4. A method for fabricating field emitters of high resolution in accordance with claim 3 wherein the further step of determining the proper thickness for the film in the aperture comprises the still further steps of:
   tilting the metallic holder electrode into a vertical position from the horizontal;
   tilting the metallic holder electrode back into the horizontal position, and
   observing a flat spot in the center of the film, which will disappear in approximately one second, if the film is the proper thickness.

5. The method of claim 1, wherein said filament blank is tungsten.

6. The method of claim 5, wherein said etchant electrolyte is an alkali metal hydroxide.

7. The method of claim 1 wherein said filament blank is Nichrome.

8. The method of claim 1 wherein the filament blank is pendantly supported in an electrically conductive liquid through which said current flows to complete the electric circuit.

9. The method of claim 8 wherein the liquid is cupric sulfate.

References Cited

UNITED STATES PATENTS

| 2,434,286 | 1/1948 | Pfann | 204—142 |
| 2,628,936 | 2/1953 | Albano | 204—142 |
| 2,721,838 | 10/1955 | Visser | 204—142 |
| 3,271,280 | 9/1966 | Shroff | 204—142 |
| 3,224,953 | 12/1965 | Russell | 204—224 |

FOREIGN PATENTS 1,255,458 1/1961 France.

ROBERT K. MIHALEK, Primary Examiner

U.S. Cl. X.R.
204—143, 224, 272